United States Patent [19]
Robinson et al.

[11] Patent Number: 6,028,696
[45] Date of Patent: Feb. 22, 2000

[54] CHARGE CONTROLLED MIRROR WITH IMPROVED FRAME TIME UTILIZATION AND METHOD OF ADDRESSING THE SAME

[75] Inventors: William P. Robinson, Thousand Oaks; Michael J. Little, Woodland Hills, both of Calif.

[73] Assignee: MEMSolutions, Inc., Westlake Village, Calif.

[21] Appl. No.: 09/172,615

[22] Filed: Oct. 15, 1998

[51] Int. Cl.⁷ .......................... G02B 26/02; G02B 26/08
[52] U.S. Cl. .......................... 359/293; 359/262; 348/782
[58] Field of Search .................................. 359/293, 227, 359/230, 298, 262; 345/85; 348/781, 782

[56] References Cited

U.S. PATENT DOCUMENTS

| | | | |
|---|---|---|---|
| 2,276,359 | 3/1942 | Von Ardenne | 359/293 |
| 2,681,380 | 6/1954 | Orthuber | 178/5.4 |
| 2,682,010 | 6/1954 | Orthuber | 315/8 |
| 2,733,501 | 2/1956 | Orthuber et al. | 29/25.17 |
| 3,517,126 | 6/1970 | Yamada et al. | 178/7.5 |
| 3,600,798 | 8/1971 | Lee | 29/592 |
| 3,667,830 | 6/1972 | Rottmiller | 359/293 |
| 3,678,196 | 7/1972 | Roth | 178/7.5 D |
| 3,746,911 | 7/1973 | Nathanson et al. | 315/21 R |
| 3,886,310 | 5/1975 | Guldberg et al. | 178/7.5 D |
| 3,896,338 | 7/1975 | Nathanson et al. | 315/373 |
| 4,229,732 | 10/1980 | Hartstein et al. | 340/378.2 |
| 4,387,964 | 6/1983 | Arrazola et al. | 350/331 R |
| 4,441,791 | 4/1984 | Hornbeck | 350/360 |
| 4,592,628 | 6/1986 | Altman et al. | 350/486 |
| 4,615,595 | 10/1986 | Hornbeck | 353/122 |
| 4,680,579 | 7/1987 | Ott | 340/783 |
| 4,698,602 | 10/1987 | Armitage | 332/7.51 |
| 4,710,732 | 12/1987 | Hornbeck | 332/7.51 |
| 4,728,174 | 3/1988 | Grinberg et al. | 350/334 |
| 4,744,636 | 5/1988 | Haven et al. | 350/331 R |
| 4,765,717 | 8/1988 | Buzak et al. | 350/331 R |
| 4,784,883 | 11/1988 | Chitwood et al. | 428/1 |
| 4,786,149 | 11/1988 | Hoenig et al. | 350/356 |
| 4,805,038 | 2/1989 | Seligson | 358/296 |
| 4,826,293 | 5/1989 | Grinberg et al. | 350/331 R |
| 4,884,874 | 12/1989 | Buzak et al. | 350/336 |
| 4,956,619 | 9/1990 | Hornbeck | 330/4.3 |
| 5,083,857 | 1/1992 | Hornbeck | 359/291 |
| 5,142,405 | 8/1992 | Hornbeck | 359/226 |
| 5,172,262 | 12/1992 | Hornbeck | 359/223 |
| 5,196,767 | 3/1993 | Leard et al. | 315/349 |
| 5,280,277 | 1/1994 | Hornbeck | 345/108 |
| 5,287,215 | 2/1994 | Warde et al. | 359/293 |
| 5,416,514 | 5/1995 | Janssen et al. | 348/196 |
| 5,442,414 | 8/1995 | Janssen et al. | 353/98 |
| 5,444,566 | 8/1995 | Gale et al. | 359/291 |
| 5,448,314 | 9/1995 | Hemibuch et al. | 348/743 |

(List continued on next page.)

OTHER PUBLICATIONS

Duane A. Haven, "Electron–Beam Addressed Liquid–Crystal Light Valve," IEEE Transactions on Electron Devices, vol. ED–30, No. 5, 489–492, May 1983.

J.A. van Raalte, "A New Schlieren Light Valve for Television Projection," Applied Optics vol. 9, No. 10. (Oct. 1970), p. 2225.

R. Noel Thomas et al., "The Mirror–Matrix Tube: A Novel Valve for Projection Displays," IEEE Transactions on Electron Devices, vol. ED–22, No. 9, Sep. 1975, p. 765.

Primary Examiner—Georgia Epps
Assistant Examiner—Margaret Burke
Attorney, Agent, or Firm—Fleshner & Kim

[57] ABSTRACT

A beam addressed electrostatically-actuated charge controlled mirror (CCM) with frame time utilization approaching 100% is provided by partially coating the CCM's pixelized beam addressing surface with a material having the opposite electron affinity. Each pixel of the pixelized beam addressing surface has first and second portions that exhibit secondary emission coefficients that are respectively less than and greater than one for the same beam energy. A beam or beams that are capable of subpixel resolution selectively address each pixel's first and second portions to control the amount of charge on the pixelized beam addressing surface and its localized potentials.

21 Claims, 3 Drawing Sheets

U.S. PATENT DOCUMENTS

| | | | |
|---|---|---|---|
| 5,452,024 | 9/1995 | Sampsell | 348/755 |
| 5,471,341 | 11/1995 | Warde et al. | 359/293 |
| 5,493,439 | 2/1996 | Engle | 359/292 |
| 5,504,614 | 4/1996 | Webb et al. | 359/223 |
| 5,508,738 | 4/1996 | Janssen et al. | 348/196 |
| 5,552,925 | 9/1996 | Worley | 359/230 |
| 5,557,177 | 9/1996 | Engle | 315/366 |
| 5,567,334 | 10/1996 | Baker et al. | 216/24 |
| 5,579,151 | 11/1996 | Cho | 359/291 |
| 5,600,383 | 2/1997 | Hornbeck | 348/771 |
| 5,631,782 | 5/1997 | Smith et al. | 359/871 |
| 5,650,881 | 7/1997 | Hornbeck | 359/871 |
| 5,669,687 | 9/1997 | Yang | 353/98 |
| 5,677,784 | 10/1997 | Harris | 359/290 |
| 5,706,061 | 1/1998 | Marshall et al. | 348/743 |
| 5,768,009 | 6/1998 | Little | 359/293 |
| 5,774,196 | 6/1998 | Marshall | 348/743 |

Electron Beam Voltage ( Energy )

Electron Beam Voltage ( Energy )

CHARGE CONTROLLED MIRROR WITH IMPROVED FRAME TIME UTILIZATION AND METHOD OF ADDRESSING THE SAME

BACKGROUND OF THE INVENTION

1. Field of the Invention

This invention relates to light modulators and more specifically to a charge controlled mirror (CCM) with improved frame time utilization.

2. Description of the Related Art

Beam-addressed light modulators use a scanning electron gun to write a charge pattern onto a pixelized beam-addressing surface of a light valve target. The charge pattern imparts a modulation onto a light beam in proportion to the pixel intensities and directs the modulated light beam through projection optics to form a video display. Such beam-addressed light valve targets have been demonstrated using transmissive and reflective liquid crystals, reflective membranes and micromirror arrays.

Most of these targets utilize the secondary electron emission characteristics of the addressing surface to write the charge pattern. As shown in FIG. 1, the addressing surface is characterized by a secondary electron emission curve 10 that plots the emission coefficients $\delta$ i.e. the ratio of emitted secondaries to incident primaries, against the landing energy of the primary electrons. At landing energies between first and second crossover points ($\delta=1$), 12 and 14, the surface exhibits a coefficient greater than one. Outside that region, the surface exhibits a coefficient less than one. In general, clean conductors have coefficients less than one and insulators have coefficients greater than one for useful beam energies.

In known systems, the write gun emits primary electrons that strike the target's addressing surface with a landing energy above the first crossover causing more secondary electrons to be ejected than incident primary electrons. The secondaries are collected by a collector electrode (grid or plate), which is held at a relatively positive potential with respect to the addressing surface. This produces a charge pattern that has a positive net charge, which increases the pixel potentials and in turn actuates the liquid crystal, membrane or micromirror to modulate the light. The degree of modulation is controlled by changing the beam current.

The write gun preferably operates above the first crossover and below the second crossover to reduce the amount of beam current that is required to write a given charge pattern. Surface coatings such as MgO or doped diamond like films that exhibit stable emission coefficients in the range of 5–50 for useful beam energies are commonly available and act as a current amplifier. Some surface materials such as clean aluminum have $\delta<1$ (0.7–0.9), and provide no current application for the primary beam. Current amplification is quite important given the nanosecond dwell times available at normal video rates for each pixel.

In video applications, each charge pattern or frame must be erased prior to the next pass of the write gun. It is well known that the brightness of the light modulator is closely tied to the optical throughput of the target. In large part, optical throughput is determined by the frame time utilization of each pixel, i.e. how long the pixel is held in its modulated position before it is erased. Ideally, each pixel would be held at its intended modulated position until that pixel was to be rewritten and then instantaneously erased. This would maximize the amount of light passed through the projection optics while maintaining video performance.

A common erasure technique is RC decay, in which the deposited charge is bled off over the frame time. The device's RC time constant must be short enough that the pixel intensity is erased prior to writing the next value in order to maintain video performance. The main drawback, however, is the fact that approximately two-thirds of the available light is lost due to RC decay. This greatly limits the display's brightness and contrast capabilities.

In the early 1970s, Westinghouse Electric Corporation developed an electron gun addressed cantilever beam deformable mirror device, which is described in R. Thomas et al., "The Mirror-Matrix Tube: A Novel Light Valve for Projection Displays," ED-22 IEEE Tran. Elec. Dev. 765 (1975) and U.S. Pat. Nos. 3,746,310, 3,886,310 and 3,896,338. A low energy scanning electron beam deposits a charge pattern directly onto cloverleaf shaped mirrors causing them to be deformed toward a reference grid electrode on the substrate by electrostatic actuation. Erasure is achieved by raising the target voltage to equal the field mesh potential while flooding the tube with low energy electrons to simultaneously erase all of the mirrors, i.e. the whole frame. This approach improves the modulator's FTU but produces "flicker", which is unacceptable in video applications.

More recently Optron Systems, Inc., as described in Warde et al., U.S. Pat. No. 5,287,215, has developed a membrane light modulation system in which a charge transfer plate (CTP) couples charge from a scanning electron gun under vacuum through to potential wells in atmosphere. A deformable reflecting membrane is supported on insulating posts and spans the wells. The CTP serves as a high-density multi-feedthrough vacuum-to-air interface that both decouples the electron beam interaction from the membrane and provides the structural support required to hold off atmospheric pressure.

Warde suggests two ways to write and erase the CTP. The first is very similar to the Westinghouse technique in that the membrane is switched to the grid voltage and rescanned to erase the charge pattern, which Warde acknowledges produces image flicker. The second flickerless mode of operation, which Warde refers to as grid-stabilized, applies the video signal to the membrane and fixes the beam current. This can work for low resolution displays but becomes very difficult at high resolutions due to the capacitance of the membrane. Also, voltage swing requirements are higher, approximately 50V versus less than 10V, which combined with the increased capacitance drive the video amplifier power requirements up 25 to 2500 times.

An electron beam addressed liquid crystal light valve of the cathode-ray tube type is described in Duane A. Haven, *IEEE Transactions on Electron Devices*, Vol. ED-30, No. 5, 489–492, May 1983. The light valve of Haven is a form of cathode-ray tube (CRT) having a twisted nematic liquid crystal cell, one substrate surface of which serving as a target for a writing electron beam propagating in the tube. The target substrate comprises a thin sheet of dielectric material and forms one face of the liquid crystal cell.

The CRT also includes a writing electron gun, a flood electron gun, and a ring-type collector electrode positioned adjacent the periphery of the target surface. The flood electron gun maintains the target surface of the cell at a desired operating electrostatic potential VFG, which is the potential of the flood electron gun cathode. Polarized light propagating from an external source enters the CRT through an optically transparent entry window on one side of the tube and passes through the cell and out through an exit window. The writing and flood guns are mounted at oblique angles relative to the target substrate to keep them out of the light path. Unwritten areas of the liquid crystal cell remain in an "OFF" state that rotates by 90 degrees the polarized direction of the light emanating from the external source. Areas addressed by the writing beam are temporarily switched into an "ON" state that leaves unchanged the polarization direction of the light emanating from the external source. This creates a light image pattern that is detected by an analyzing polarizer positioned in the path of light exiting the exit window.

The transparent collector electrode of the light valve of Haven is operated at a potential VCOL, which is positive relative to the potential VFG of the target surface. The flood gun electrons strike the target surface with an energy that is below the first crossover point on the secondary electron emission ratio curve for the dielectric material forming the target surface. Under these conditions, the electrostatic potential of the target surface is stabilized to the potential of the flood gun cathode. The writing gun is operated under conditions so that the writing beam electrons strike the target surface with an energy that is above the first crossover point but below the second crossover point of the dielectric material.

When the writing beam strikes the target surface, secondary emission causes the written area to charge positive relative to the unwritten areas of the target surface, which are at the flood gun potential VFG. The potential of the written area rises, approaching the potential VCOL of the collector electrode and driving the liquid crystal cell into the "ON" state. After the writing beam is turned off, the potential drops back to the flood gun cathode potential VFG and allows the liquid crystal cell to relax to the "OFF" state. This occurs because VCOL is below the first crossover point and more electrons are absorbed than are emitted from the previously written area.

The ring-type collector electrode is positioned adjacent the periphery of the liquid crystal cell and outside the projection light path through the valve. There is a relatively large separation between the collector electrode and the central areas of the target surface, Which separation causes the collection of secondary electrons emitted from the central areas on the target surface to be relatively inefficient. The reason for such inefficiency is that secondary electrons emitted from the central areas on the target surface redeposit on the positively charged, previously written areas of the target surface. This redeposition of secondary electrons at least partly erases the written image, thereby reducing the resolution and contrast capability of the light valve.

A different technique for erasing a beam addressed liquid crystal light valve is presented in U.S. Pat. Nos. 5,765,717 and 5,884,874. The transparent collector electrode is segmented into four or more electrically isolated segments. As the erase and write guns raster scan the light valve, with the write gun lagging by two segments, a controller switches the potentials on the segments above the erase and write guns to ground and to +300V with respect to the incident surface. Since both guns operate at energies above the crossover point, the erase gun secondaries will redeposit themselves over the segment thereby erasing the charge pattern and the write gun secondaries will be collected by the segment thereby writing a new charge pattern.

Although this approach provides improved resolution and contrast, it requires a segmented grid and a synchronized controller. Since both guns operate above the crossover, image resolution can be further improved by coating the entire surface of the LCLV with a material such as magnesium oxide (MgO), which exhibits a very high emission coefficient, as described in U.S. Pat. No. 4,744,636. However, the best FTU that can be achieved using the segmented grid is (n−2)/n where n is the number of segments. For example, a 4 segment grid would have only a 50% FTU.

SUMMARY OF THE INVENTION

In view of the above problems, the present invention provides a charge controlled mirror (CCM) with FTU approaching 100%.

This is accomplished by partially coating the CCM's pixelized beam addressing surface with a material having the opposite electron affinity so that each pixel comprises a first portion that exhibits an emission coefficient greater than one for a desired beam energy and a second portion that exhibits an emission coefficient less than one for the same beam energy. A charge beam or beams that are capable of subpixel resolution selectively address each pixel's first and second portions at the beam energy to write a charge pattern onto the pixelized beam-addressing surface. Depending upon the CCM configuration, the pixelized beam-addressing surface may be the array of micromirrors or a membrane that decouples the micromirrors from the addressing beam(s).

Two different modes of writing the charge patterns onto the pixelized membrane are currently contemplated; a differential write mode and an erase/write mode. In the differential write mode, the current pixel value is stored in memory and the next pixel value is written by addressing either the first or second portions. In the erase/write mode, the beam is first directed onto either the first or second portion to drive the pixel potential to a desired reference potential, i.e. the erase state. The beam is then directed onto the other portion to adjust the pixel potential away from the reference potential, i.e. the write state. In either case, FTU approaches 100%.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a beam addressed electrostatically actuated CCM with FTU approaching 100%.

This represents an improvement by a factor of approximately three when compared to conventional RC decay, which translates into three times the brightness or contrast ratio. As compared to known active erasure techniques, the present invention requires neither a second scanning electron gun nor a controller to switch the collector grid potential and improves FTU by up to a factor of two. However, the present invention does require an electron beam having subpixel resolution that is capable of reliably addressing each and every pixel to avoid the formation of moire patterns.

Figure 2:
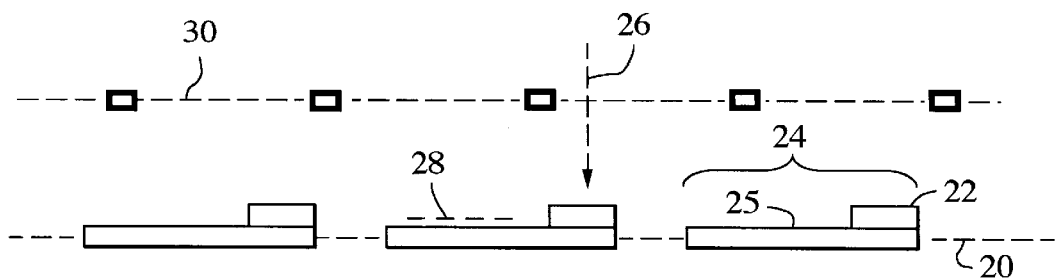
FIG. 2 is a sectional view of a single pixel of a CCM's pixelized beam addressing surface, which is partially coated with a material that exhibits the opposite electron affinity at the beam energy in accordance with the present invention.

As shown in FIG. 2, improved FTU is accomplished by partially coating the CCM's pixelized beam addressing surface 20, e.g. the micromirror array or a decoupling membrane, to form a control pad 22. As a result, each pixel 24 of the pixelized beam addressing surface 10 comprises an exposed portion 25 of the addressing surface and control pad 22. A beam or beams 26 having subpixel resolution selectively address each pixel's exposed portion 25 and control pad 22 with the same beam energy at which they exhibit opposite electron affinities, i.e. one greater than and one less than unity, to write a charge pattern 28 onto pixel 24. A positively biased collector grid 30 collects the secondaries emitted from both the addressing surface and control pad 22. Charge pattern 28 modulates the pixelized surface potentials, which in turn produce the electrostatic forces that actuate the micromirrors.

Beam 26 can be produced by a single emitter such as an electron gun that is raster scanned across the backside of addressing surface 20, a line of emitters that are stepped in some manner to sequentially address rows of pixels on surface 20, or an array of emitters that are row-column addressed to write rows of pixels on surface 20 such as a field emission array (FEA). The scanning electron gun will typically scan across each pixel striking control pad 22 and then the exposed portion 25 of surface 20. The scanning gun may be dithered to address the two different areas. The line and array configurations will typically produce multiple fixed beams per pixel with at least one beam being aligned with control pad 22 and at least one beam being aligned to the surface's exposed portion 25.

Figure 1:
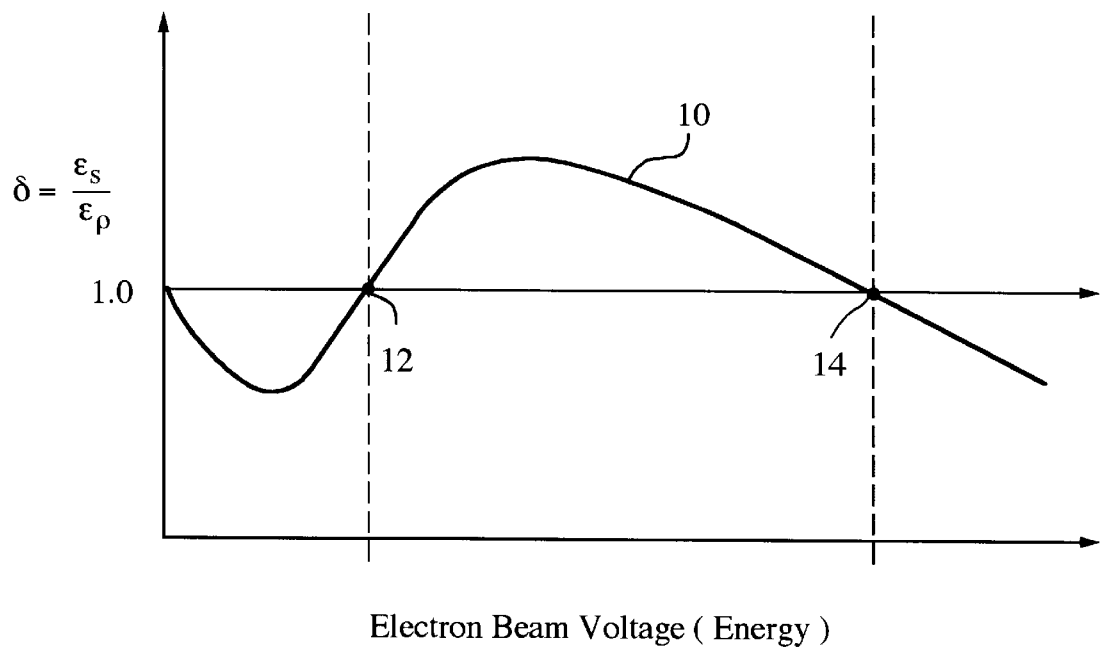
FIG. 1, as described above, is a plot of the secondary electron emission curves for two different materials.
Figure 3:
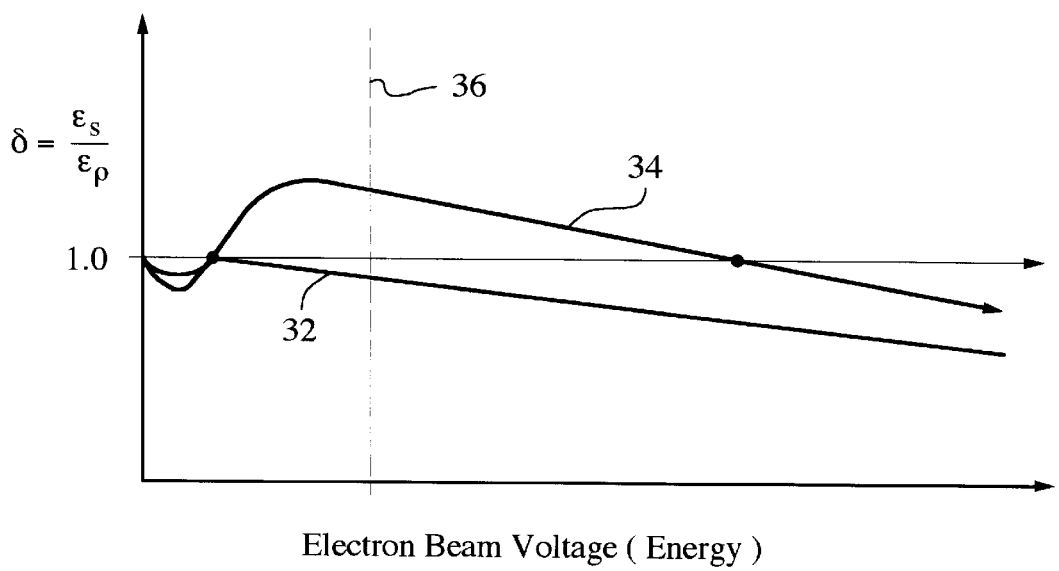
FIG. 3 is a plot of the secondary electron emission curves for the addressing surface and the coating material shown in FIG. 2.

The secondary electron emission curves, 32 and 34, for typical addressing surface and control pad materials, respectively, are shown in FIG. 3. The materials and beam landing energy 36 are selected such that the exposed portion and control pad exhibit opposite electron affinities. As depicted, control pad 22 has an emission coefficient greater than one and the addressing surface has an emission coefficient less than one at landing energy 36.

As mentioned previously, certain materials are known to exhibit emission coefficients greater than or less than one for useful beam energies. For example, most clean conductors including aluminum have coefficients less than one and most insulators including MgO have coefficients greater than one. However, doped diamond like carbon is both a conductor and a high emission material, which makes it particularly useful in some applications.

Figure 4:
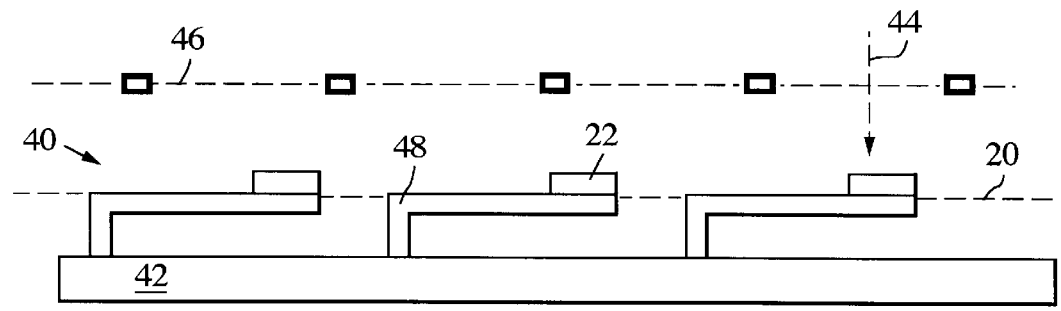
FIG. 4 is a sectional view of a CCM whose mirrors are partially coated with a secondary emission material.

As shown in FIG. 4, the CCM includes a micromirror array 40 that is supported on a transparent substrate 42 and directly addressed by a beam 44. In this configuration, the backside of array 40 is partially coated to define control pads 22 and provide beam addressing surface 20. Control pads 22 cover only a portion of each mirror so that for each pixel both the control pad and the mirror are exposed to beam 44. A clean aluminum mirror surface and a MgO control pad would exhibit the desired secondary emission characteristics for useful beam energies. Alternately, the micromirror array could be supported such that the control pads are on the undersides of the mirrors facing the beam. Furthermore, the mirrors may be configured for use in either a projection or direct-view display.

A source emits the scanning beam or fixed beams 44 of primary electrons at a cathode potential. The electrons are accelerated toward an anode potential through a collector grid 46 and selectively strike the individual mirrors 48 and their control pads 22 causing secondary electrons to be emitted and collected by collector grid 46. The collector grid potential is generally positive with respect to the mirrors and is preferably also positive with respect to the anode potential to establish a uniform electric field that assists in guiding the secondary electrons to the collector grid.

When beam 44 strikes control pad 22 the net positive charge on mirror 48 is increased and the mirror potential is increased. Similarly, when the same or a different beam 44 strikes the exposed portion of mirror 48 at the same landing energy the net positive charge is reduced and mirror potential is reduced. The selective addressing of control pad 22 and mirror 48 in combination with the modulation of the beam current determines the localized potentials on the micromirror array.

The mirrors may be electrostatically actuated in several ways including, but not limited to, attracting them to a reference electrode on the surface of substrate 42 similar to the Westinghouse device, attracting them to collector grid 48 as discussed in copending U.S. application Ser. No. 09/172, 614 entitled "Grid-Actuated Charge Controlled Mirror and Method of addressing the same", filed Oct. 15, 1998, or by using fringing forces to repel them away from an underlying electrode that is electrically coupled to the mirror as described in U.S. Pat. No. 5,768,009. In the two former cases, the potential difference between the mirrors and the reference electrode or the collector grid will determine the mirror deflection. In the latter case, the magnitude of the mirror potential will control deflection. Note the repulsive fringing forces are much weaker than attractive forces and thus require more compliant hinges and more deposited charge to achieve the same mirror deflection.

Figure 5:
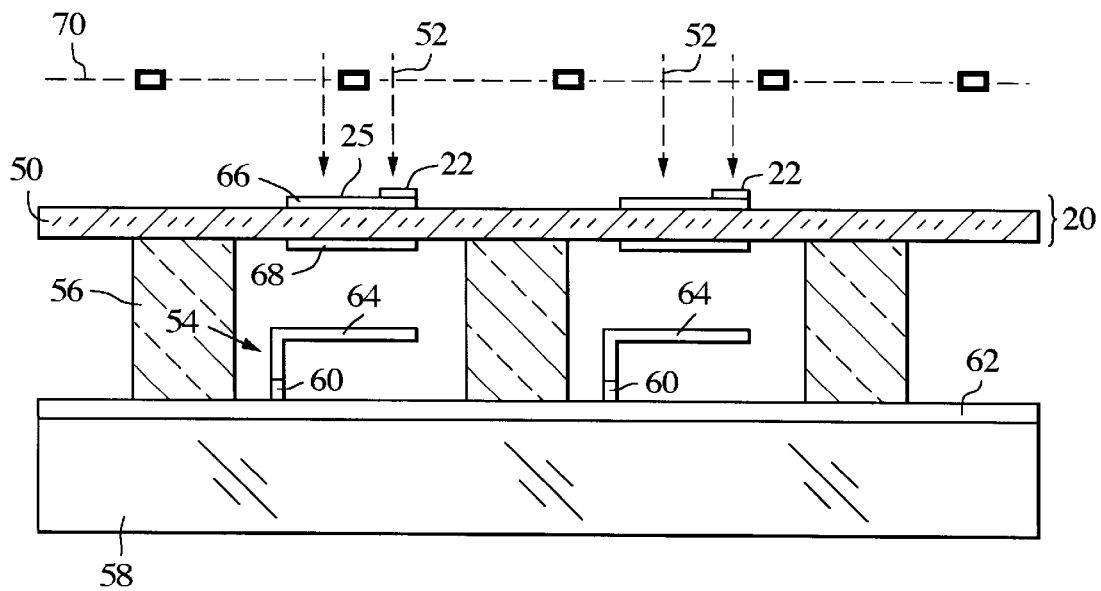
FIG. 5 is a sectional view of a membrane-actuated CCD in which the membrane's attractor pads are partially coated with a secondary emission material.

As shown in FIG. 5, the insertion of a thin floating potential insulating membrane 50 between an array of beams 52 and a micromirror array 54 serves to decouple them. Decoupling overcomes the problems of limited deflection range, high beam current, electrostatic instability and resolution associated with known electrostatically-actuated micromirror targets, and allows the mirror to be optimized for reflectivity and video performance. In this configuration, the pixelized beam addressing surface 20 is the backside of insulating membrane 50 with control pads 52 formed thereon. Membrane 50 is typically so thin, suitably a couple of microns, that it cannot support itself against the applied electric field due to the induced charge pattern and must be supported on an array of posts 56.

Micromirror array 54 and post array 56 are formed on a transparent substrate 58, which may be covered with a passivation layer. A conductive grid 60 is formed on a very thin transparent equipotential layer 62, suitably 100Å or less of transparent conducting film or oxide (TCF or TCO) on substrate 58. Layer 62 prevents a potential difference from being developed between the mirrors and substrate that could otherwise cause instability. Grid 60 ensures electrical continuity between all of the micromirrors and holds them all at a reference potential, suitably anode potential. Layer 62 could perform both functions, but would have to be much thicker to ensure electrical continuity, which would reduce optical efficiency.

In the preferred embodiment, membrane 50 is sandwiched between arrays of top and bottom attractor pads, 66 and 68, which together define a capacitor array. Attractor pads 66, which support control pads 22 and provide the exposed portion 25 of the addressing surface, improve the uniformity of the actuating forces, improve resolution and can be configured to increase the useable deflection range up to approximately 83% of the mirror-to-membrane spacing. Attractor pads 68 mirror any charge deposited on pads 66 thereby effectively transferring the charge pattern deposited on the backside of the membrane to the frontside of the membrane without reducing the amount of charge seen by the mirror. This increases the deflection per unit of deposited charge. Note control pads 22 could be formed directly on membrane 50 and achieve adequate charge localization to resolve an image.

To actuate micromirror 64, the source emits the array of beams 32 whose primary electrons are accelerated through a collector grid 70 and strike the backside of membrane 50, specifically control pads 22 and attractor pads 66, causing secondary electrons to be ejected and collected on the collector grid. This effectively writes a charge pattern onto the membrane's attractor pads 66, which is then transferred to attractor pads 68 to create localized potential differences between membrane 50 and micromirrors 64, which are held at reference potential.

The potential differences produce attractive forces that tend to pivot and deflect micromirrors 64 outward away from substrate 58 and towards membrane 50. The attractive force is opposed by the mirror hinge's spring force. The amount of deflection is determined by the force rebalance equation for a given geometry. The selective addressing of control pad 22 and attractor pad 66 in combination with the modulation of the beam current determines the magnitude of the potential difference and the electrostatic force exerted on mirror 64, hence the deflection of the mirror.

Figure 6A:
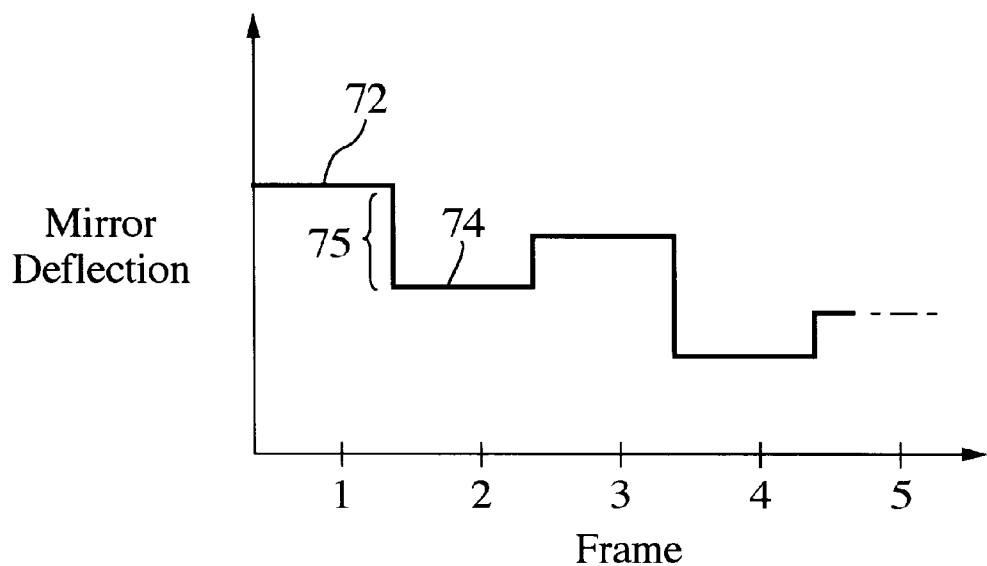
FIGS. 6a and 6b are plots of the mirror deflection for erase-write and differential write modes of addressing the CCM, respectively.
Figure 6B:
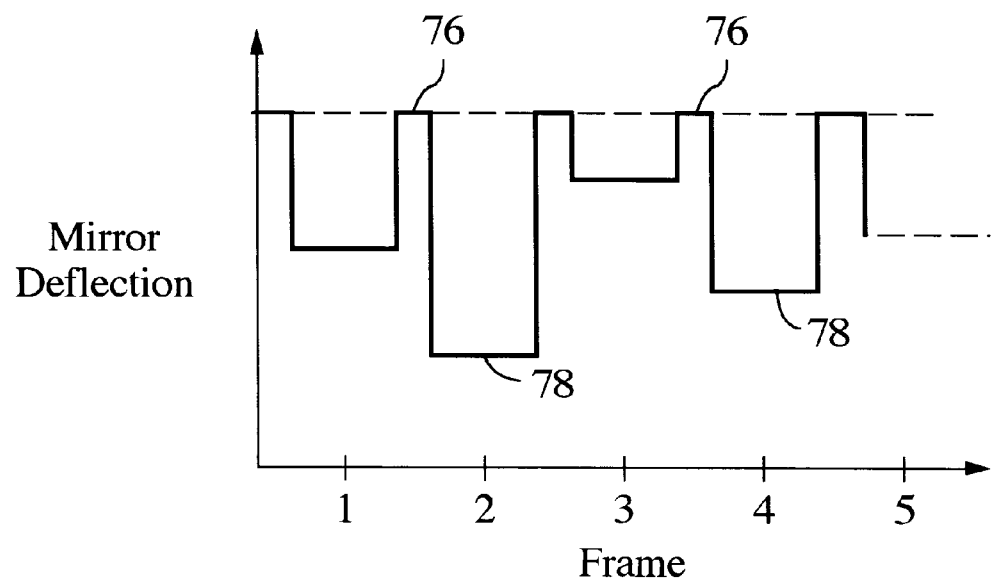

As shown in FIGS. 6a and 6b, two different modes of writing the charge pattern onto the pixelized membrane are currently contemplated; a differential write mode and an erase/write mode. In the differential write mode, the current deflection 72 is stored in memory and the next deflection 74 is written by addressing either the attractor pad or the control pad to produce a differential deflection 75. In the erase/write mode, the beam is first directed onto either the attractor pad or the control pad to drive the pixel potential to a desired erase potential, i.e. the erase state deflection 76. The beam is then directed onto the other pad to adjust the pixel potential away from the reference potential, i.e. the write state deflection 78. In either case, FTU approaches 100%.

In a specific example of the erase/write mode, the beam is first directed onto the control pad, δ>1, so that the pixel potential rises until it stabilizes just above the grid potential. The exact difference depends on the low energy spectrum of the secondary electrons and the electrode geometry. This is the erase state, which corresponds to a maximum mirror deflection. Immediately thereafter the beam is directed onto the attractor pad, δ<1, so that the pixel potential is reduced until it and the deflection angle reaches the desired value. The charge is then held on the pixel until the next frame In the erase/write mode, the control pad preferably exhibits an emission coefficient that is much greater than unity so that the mirror can be erased quickly without having to increase the beam current. In the differential mode, the control pad preferably exhibits an emission coefficient that is just slightly greater than unity to provide some degree of symmetry for the differential write.

While several illustrative embodiments of the invention have been shown and described, numerous variations and alternate embodiments will occur to those skilled in the art. For example, the target surface of a reflective membrane device or a reflective LCD could be partially coated within a secondary emission material. Also, the source could produce an ion beam rather than an electron beam. Such variations and alternate embodiments are contemplated, and can be made without departing from the spirit and scope of the invention as defined in the appended claims.

We claim:

1. A charge controlled mirror (CCM), comprising:
   an array of electrostatically actuable micromirrors;
   a pixelized beam addressing surface in electrical communication with said array where each pixel has first and second portions that exhibit secondary emission coefficients that are respectively less than and greater than one for a given beam energy; and
   a conductive grid spaced apart from said addressing surface for collecting secondary electrons that are ejected from said first and second portions of said addressing surface.

2. The CCM of claim 1, wherein said pixelized beam addressing surface is a part of the micromirror array, each said micromirror having at least one said control pad formed thereon that partially covers said mirror and exhibits an opposite electron affinity.

3. The CCM of claim 1, wherein said micromirrors are held at reference potential, said pixelized beam addressing surface comprising:
   a thin insulating membrane between said array of micromirrors and said collector grid; and
   an array of control pads on said insulating membrane that exhibit electron affinities opposite said insulating membrane.

4. The CCM of claim 1, wherein said micromirrors are held at reference potential, said pixelized beam addressing surface comprising:
   a thin insulating membrane between said array of micromirrors and said collector grid;
   an array of attractor pads on said insulating membrane above respective micromirrors; and
   an array of control pads on said respective attractor pads that exhibit electron affinities opposite that of said attractor pads.

5. A charge controlled mirror (CCM), comprising:
   an array of electrostatically actuable micromirrors, each said micromirror having an addressing surface that exhibits a secondary emission coefficient less than one;
   an array of control pads that partially cover the respective micromirrors' addressing surfaces and which exhibit a secondary emission coefficient greater than one; and
   a grid that is spaced apart from said array of micromirrors and held at a fixed positive potential with respect to said micromirrors.

6. The CCM of claim 5, wherein said micromirrors are electrically isolated to inhibit charge bleed-off.

7. A light modulator, comprising:
   a charge controlled mirror (CCM) comprising;
      an array of electrostatically actuable micromirrors;
      a pixelized beam addressing surface in electrical communication with said array in which each pixel has a first and second portions that exhibit secondary emission coefficients that are respectively less than and greater than one for a given beam energy; and a conductive grid spaced apart from said addressing surface for collecting secondary electrons that are ejected from said first and second portions; and a source that selectively addresses each pixel's first and second portions with a charge beam having subpixel resolution at said beam energy to write a charge pattern onto the pixelized beam-addressing surface.

8. The light modulator of claim 7, wherein said pixelized beam addressing surface is the micromirror array, each said micromirror having at least one said control pad formed thereon that partially covers said mirror and exhibits an opposite electron affinity.

9. The light modulator of claim 7, wherein said CCM further comprises a thin insulating membrane having an array of control pads thereon that exhibit opposite electron affinities and together define the pixelized beam addressing surface.

10. The light modulator of claim 9, wherein said insulating membrane further comprises a plurality of attractor pads that exhibit a secondary coefficient less than one on the thin insulating membrane above respective micromirrors, each said attractor pad supporting one of said control pads, which exhibit a secondary emission coefficient greater than one.

11. The light modulator of claim 9, wherein said source is a single scanning gun.

12. The light modulator of claim 11, wherein said scanning gun raster scans said pixelized beam addressing surface first depositing primary electrons on said second portion to erase the pixel and then depositing primary electrons on said first portion to write an amount of charge onto the pixel.

13. The light modulator of claim 7, wherein said source produces an array of charge beams in which each said charge beam is aligned with and addresses only one said portion of its opposing pixel on the addressing surface.

14. The light modulator of claim 13, wherein said source comprises a field emitter array in which at least one field emitter is dedicated to each said portion of each said pixel on said pixelized beam addressing surface.

15. The light modulator of claim 7, wherein said collector grid is held at a potential that is positive with respect to the array of micromirrors, said source first directing the charge beam onto the second portion until the pixel potential stabilizes just above the collector grid potential and then directing the charge beam onto the first portion to set the pixel potential at a desired intensity level.

16. The light modulator of claim 7, wherein said source selectively directs the charge beam to said second portion to raise the amount of charge and to said first portion to lower the amount of charge to differentially write charge onto the addressing surface.

17. A method of addressing a charge controlled mirror (CCM) having a pixelized beam addressing surface in which each pixel has first and second portions that exhibit secondary emission coefficients that are respectively less than and greater than one for a given beam energy comprising:

selectively directing a charge beam onto said first and second portions at the given beam energy to eject secondary electrons and respectively lower and raise the pixel potential to a desired value; and collecting the secondary electrons to hold the pixel potential.

18. The method of claim 17, wherein the secondary electrons are collected at a positive potential with respect to the addressing surface, said charge beam being first directed onto said second portion to raise the pixel potential to approximately the positive potential to erase the pixel and then directed onto said first portion to lower the pixel potential to the desired value.

19. The method of claim 17, further comprising storing the pixel potentials, said charge beam being selectively directed onto either said first or said second portion to differentially adjust the pixel potential to a next desired value.

20. The method of claim 18, wherein the same said charge beam is scanned across the pixels' first and second portions.

21. The method of claim 17, wherein a plurality of fixed charge beams are directed to the pixels' first and second portions, respectively.

* * * * *